Sept. 29, 1942.   F. GOSSLAU   2,297,214
AIRCRAFT MOTOR GEARING
Filed Oct. 12, 1938   4 Sheets-Sheet 3

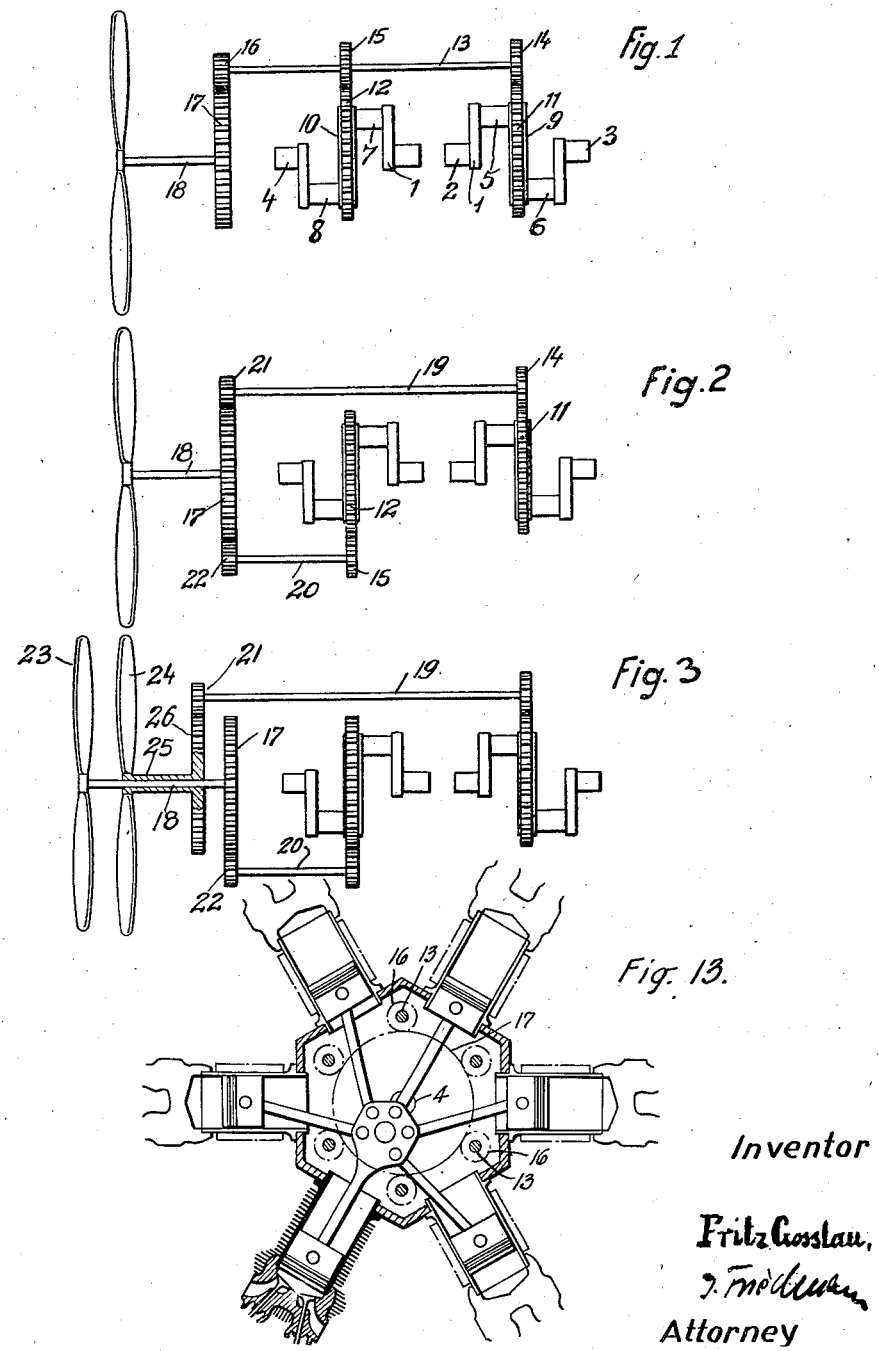

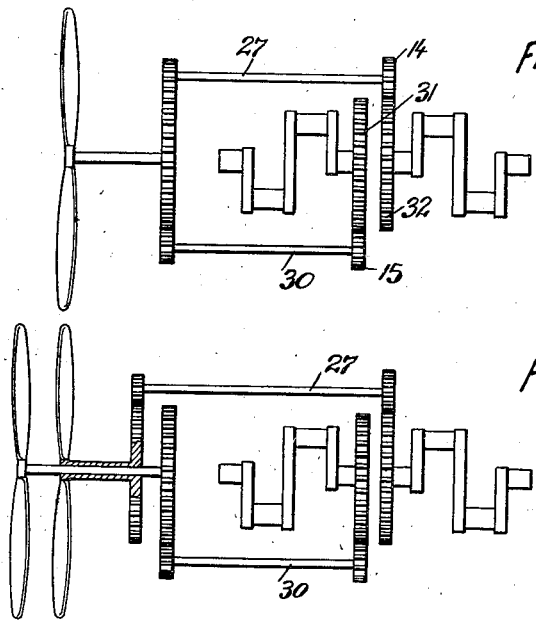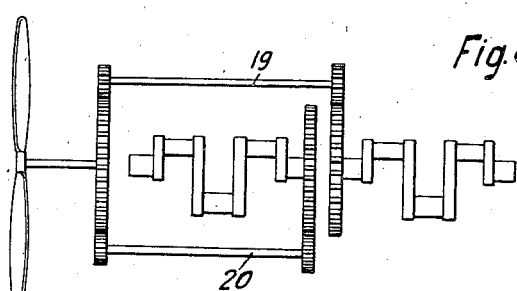

Inventor
Fritz Gosslau.
By
Attorney

Sept. 29, 1942.   F. GOSSLAU   2,297,214
AIRCRAFT MOTOR GEARING
Filed Oct. 12, 1938   4 Sheets-Sheet 4

Inventor
Fritz Gosslau
By
Attorney

Patented Sept. 29, 1942

2,297,214

UNITED STATES PATENT OFFICE 2,297,214

AIRCRAFT MOTOR GEARING

Fritz Gosslau, Berlin-Charlottenburg, Germany; vested in the Alien Property Custodian Application October 12, 1938, Serial No. 234,730
In Germany October 14, 1937

2 Claims. (Cl. 74—389)

The present invention relates to an aircraft motor and more particularly refers to an aircraft motor for high outputs.

The object of the present invention is to provide aircraft motors of high outputs which are considerably greater than those obtained hitherto with a motor unit. As the output of each cylinder may hardly be increased above 100 horsepower, the hitherto known highly developed constructions of aircraft motors, i. e. the V-shaped series motor having twelve cylinders and the double star-connected motor having eighteen cylinders, cannot be used for obtaining outputs above 2000 horsepower.

To obtain such high outputs it is possible to arrange a plurality of star-connected cylinders in tandem and cause them to actuate a common crankshaft. In such a case, however, the diameter of the crank pin is so enlarged, that unsuitable dimensions for the small end of the connecting rod and absolutely inadmissible stresses result for the bearings of the crank pins. On the one hand due to the high weight of the main end of the connecting rod and on the other hand due to the sliding speed owing to the large diameter of the crank pin, these stresses of the bearings are increased to an inadmissible degree. Moreover, the large masses of the driving unit on the long crankshafts render a further increase of diameter of the shaft imperative for reasons of the technics of vibrations.

Consequently, it has been supposed, that the construction of a motor, in particular a motor for high outputs in form of a star-connected series motor is unsuitable and unusable. Therefore, in fact, up to now no suitable star-connected motor has been developed.

Now, it has been found, that in a surprisingly simple manner a large driving unit for aircrafts having outputs of 2000 and more horsepower may be provided.

According to the invention the addition of the outputs of the individual motors and motor groups respectively from one end of the crankshaft to the other are obviated. For this purpose collecting shafts are provided which have no cranks and which substantially are subjected to torsional stresses only. Simultaneously the crank drive or crank drives are so constructed, that always part of the output only is transmitted to the collecting shaft at the connecting point or connecting points. In connection with certain modifications of the invention practically no torsional stresses result in the crank pins.

With the use of the invention the drawback inherent to aircraft, having a plurality of motors, due to the multiple resistance of the individual cars may be obviated by the fact, that a plurality of motors is combined to a single driving unit or group. In such a case a plurality of motors either may drive the same propeller or two propellers rotating in opposite directions. The advantage of an increased reliability of operation is thus obtained which offer aircrafts having a plurality of motors. Moreover, the further advantage is obtained that by combining the motors the resistance of the drive unit is considerably reduced.

These advantages may for instance be obtained in connection with star-connected series motors in a very simple manner by the fact, that the output of the various crankshafts is transferred to the propeller by means of intermediate shafts which are provided with clutches allowing connection or disconnection of individual star-connected cylinders during operation.

Hereby for instance the advantages are obtained, that very high drive outputs may be combined in a few cars. Moreover, with reduced resistance of the drive unit the possibility is given to provide more motors and thereby particularly reliable aircrafts.

Finally, the construction according to the invention has the advantage, that owing to the removal of a portion of the friction losses during flight with the same reserve of fuel greater ranges may be obtained.

In the accompanying drawings several embodiments of the invention are shown by way of example.

In these drawings:

Fig. 1 shows an arrangement of the drive of a four-row star-connected motor,

Fig. 2 shows another modification having two collecting shafts,

Figure 7:
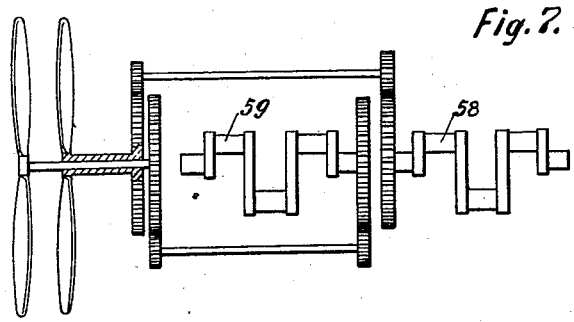
Figure 8:
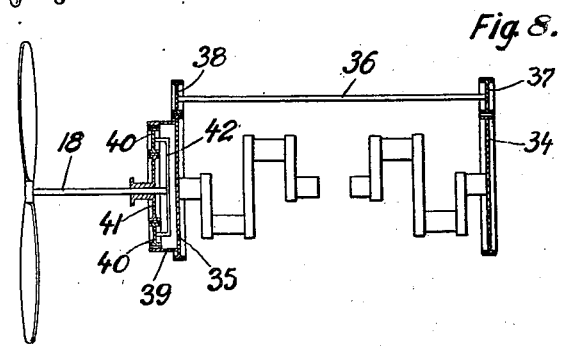
Figure 9:
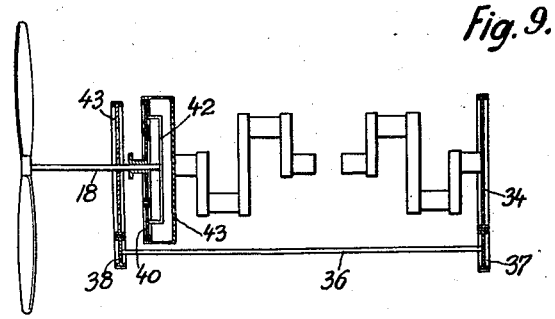
Figure 10:
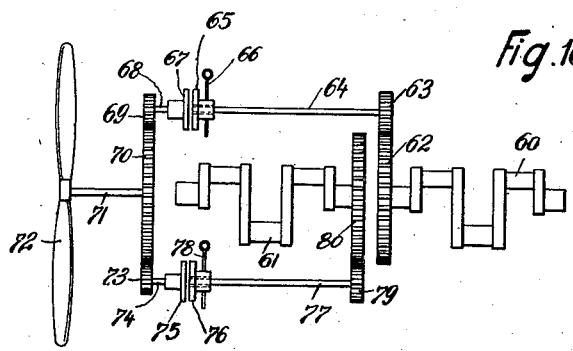
Figure 11:
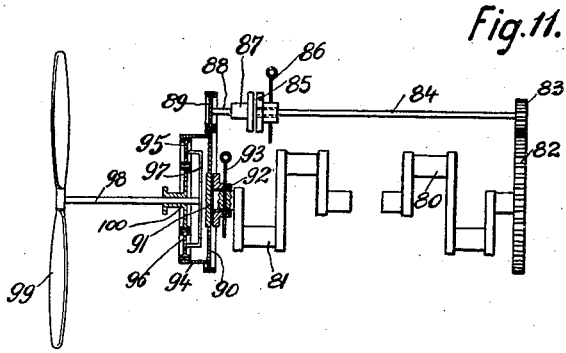
Figure 12:
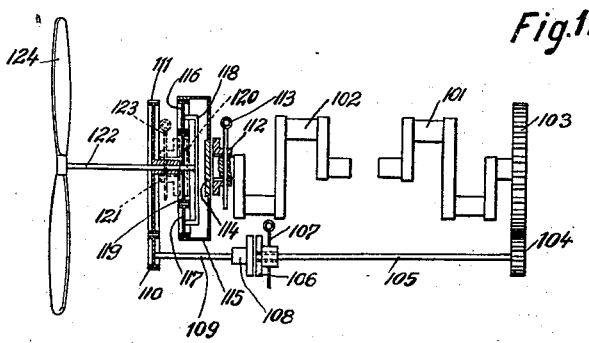

Fig. 3 illustrates a further arrangement according to which the intermediate shafts are used for driving two propellers in opposite directions, Fig. 4 represents a modification in which the crankshaft is subdivided, Fig. 5 is a view similar to that of Fig. 4, but adapted for driving two propellers, Fig. 6 is a view of a modification corresponding to that shown in Fig. 7 having two collecting shafts and a subdivided crankshaft, Fig. 7 is a view similar to that of Fig. 6 showing a construction adapted for driving two propellers rotating in opposite directions, Fig. 8 represents a modification according to which the outer end of the two parts of the crankshaft is provided with gear wheels and the reduction gear for the propeller, Fig. 9 represents a similar construction in which the driving end of the left hand crankshaft carries a wheel having internal teeth for the drive of planet wheels of the propeller drive, Fig. 10 shows a modification having a subdivided crankshaft, collecting shafts and clutches inserted in the latter, Fig. 11 illustrates a further modification having a subdivided crankshaft, a collecting shaft and a clutch built in, and a propeller gear, Fig. 12 finally represents a modification having a subdivided crankshaft, a collecting shaft and a clutch inserted in the latter, one end of the one crankshaft carrying a wheel having internal teeth for the drive of revolving wheels, and Fig. 13 shows the arrangement of the cylinders of one of the engines.

In the arrangement of a driving unit of a four-row star-connected motor shown in Fig. 1 the two two-throw crankshafts 1 are journalled in the main bearings 2, 3 and 4 and have the crank pins 5, 6, 7 and 8. The crank pins 5, 6 and 7, 8 are provided with common crank webs 9 and 10 respectively. On the crank webs gear wheel rims 11, 12 are fixed which cooperate with gear wheels 14, 15 rigidly connected to the collecting shaft 13. Another gear wheel 16 fixed on the shaft 13 engages the gear wheel 17 fixed to the propeller shaft 18. In the present case, the propeller shaft 18 extends coaxially to the crankshaft.

From the drawings the power transmission will at once be evident. The outputs of each individual star-connected cylinder directly act upon the collecting shaft without the crank pins being subjected to torsional stresses. Hereby it is possible to manufacture the crank pins and the main end of the connecting rod in the usual dimensions which, as experience has shown, warrant an operation of the crank-pin bearings free of objection.

The arrangement according to the invention, furthermore, allows operation of the propeller 18 with a smaller number of revolutions than the crankshaft as is often required.

Fig. 2 shows another embodiment of the construction according to the invention. In this construction, the output is, by means of gear wheels 14 and 15, transferred from the gear wheels 11 and 12 mounted on the crankshafts upon intermediate shafts 19 and 20 and then by way of gear wheels 21, 22 upon the gear wheel 17 and the shaft 18 on the propeller. Due to the drive from both sides, the shaft 18 is relieved of radial stresses.

Fig. 3 shows an arrangement according to which the intermediate shafts 19 and 20 are used in a simple manner for driving two propellers 23, 24 in opposite directions. The gear wheel 22 mounted on the intermediate shaft 20 drives the gear wheel 17 fixed upon the shaft 18 of the propeller 23. Rotatably mounted on the shaft 18 is a hollow shaft 25 carrying the propeller 24. The hollow shaft 25 is driven by a gear wheel 26 engaging the gear wheel 21. This arrangement has the advantage that the torsional moments and also the so-called gyratory moments of the two propellers are compensated. Hereby the steering of the aircraft is considerably improved. Moreover, a smaller diameter of the propellers results.

It is also possible to combine two or more stars with regard to their output. In such a case, individual pins may be subjected to torsional stresses also. But in all cases, parts of the total output only subject the individual pins to torsion.

Fig. 4 shows a further modification according to Fig. 1. The two intermediate shafts 27 and 30 are driven by the gear wheels 31 and 32 which are connected to the inner ends of the subdivided crankshaft.

Fig. 5 shows a corresponding arrangement for the drive of two propellers rotating in opposite directions as has been described with reference to Fig. 3.

Fig. 6 shows two three-throw crankshafts operatively connected with intermediate shafts 19 and 20.

Fig. 7 shows the arrangement of two three-throw crankshafts in connection with the drive of two propellers rotating in opposite directions as has been explained in connection with Fig. 3.

In this figure 58 and 59 designate the right hand crankshaft and the left hand crankshaft respectively. The power transmitting gear wheels connected to the crankshafts are arranged on the left hand end of the shaft 58 and on the right hand end of the shaft 59. The two ends are facing each other and lie in the middle of the whole crankshaft. Otherwise this construction exactly corresponds to that shown in Fig. 3.

Fig. 8 shows a construction according to which gear wheels 34 and 35 are mounted on the outer ends of the two crankshafts. The gear wheels 34, 35 engage with gear wheels 37, 38 arranged at the ends of an intermediate shaft 36. Connected to the gear wheel 35 is the rotating rim 39 provided with internal teeth. If the rim 39 rotates, the gear wheels 40 roll on the gear wheel 41 rigidly connected to the casing, whereby the support 42 and the shaft 18 of the propeller are driven with a corresponding reduction of gear.

Fig. 9 shows a similar construction according to which, however, on the driving end of the left hand crankshaft the wheel 43 having internal teeth only is provided for driving the planet wheel 40, the support 42 and the shaft 18 of the propeller. The output of the rear crankshaft is transferred by means of the gear wheels 34 and 37 to the intermediate shaft 36 and the gear wheels 38 and 43, the wheel 43 being rigidly connected to the shaft 18. The reduction of gear resulting from the planet wheel drive is, for the drive by way of the gears 34, 37, 38, so designed that the wheel 43 mounted upon the shaft 18 has the same speed of rotation as the support 42.

In the construction shown in Fig. 10 the right hand crankshaft and the left hand crankshaft are designated 60 and 61 respectively. At the left hand end of the right hand crankshaft 60 a gear wheel 62 is fixed which cooperates with the gear wheel 63 mounted upon the shaft 64. On the latter the clutch 65 is provided in such a manner that it may, by means of a coupling member 66, be connected and disconnected at will to and from the shaft 64. The other part 67 of the clutch is arranged upon a shaft 68 carrying the gear wheel 69 which engages another gear wheel 70 mounted upon the shaft 71 of a propeller 72.

The gear wheel 70, moreover, engages another gear wheel 73 fixed upon a shaft 74 on which a clutch part 75 also is mounted. The other clutch part 76 is arranged on a shaft 77 and may at will be connected and disconnected to and from the latter by means of a coupling member 78. Moreover, a gear wheel 79 is fixed to the shaft 77 engaging with a gear wheel 80 carried by the right hand end of the crankshaft 61.

According to the construction shown in Fig. 11 the right hand crankshaft and the left hand crankshaft are designated 80 and 81 respectively. At the outer end of the right hand crankshaft 80 a gear wheel 82 is provided engaging with another gear wheel 83 mounted upon the collecting shaft 84. Moreover, a clutch part 85 also is provided on the shaft 84 which may be connected and disconnected at will to and from the shaft 84 by means of a coupling member 86. The other clutch part 87 is mounted upon a shaft 88 carrying a gear wheel 89 which engages another gear wheel 90 in which is arranged a part 91 of another clutch. The other part 92 of this clutch is arranged upon the left hand end of the crankshaft 81 in such a manner, that it may be connected and disconnected to and from this crankshaft by means of a coupling member 93. Connected to the gear wheel 90 is a cylindrical projection 94 provided with a toothed rim into which the planet wheels 95 and 96 may engage which are rotatably mounted upon a support 97. The latter is rigidly connected to the propeller 99 by means of the shaft 98. The planet wheels 95 and 96 roll upon a rim 100 having internal teeth which may be rotated round the axis of the shaft 98.

In the construction shown in Fig. 12 the right and left hand crankshafts are designated with 101 and 102 respectively. At the outer end of the right hand crankshaft a gear wheel 103 is provided engaging with another gear wheel 104 rigidly mounted upon the shaft 105. Mounted on this shaft also is the one part 106 of a clutch which may be connected and disconnected to and from the shaft 105 by means of the coupling member 107. The other part 108 of this clutch is rigidly mounted upon a shaft 109 which carries another gear wheel 110 engaging with a gear wheel 111.

At the left hand end of the crankshaft 102 a clutch part 112 is provided in such a manner, that it may be connected and disconnected to and from the crankshaft by means of the coupling member 113. The other part 114 of the last mentioned clutch is rigidly arranged upon a dishlike support 115 rotating about the axis of the clutch parts 112, 114. The support 115 is provided with a rim having internal teeth into which engage planet gear wheels 116, 117 rotatably mounted upon a support 118, and which roll on another toothed rim 119 which is rigidly mounted at the one side of a clutch part 120. The other clutch part 121 is mounted upon a shaft 122 and may be selectively connected and disconnected to and from the shaft 122 by means of a coupling member 123. Rigidly connected to the shaft 122 also is the gear wheel 111 described already above. On this shaft 122 also the propeller 124 is provided.

The practical construction of the aircraft motor according to the present invention results in substantial advantages. So for instance, the crank case may be subdivided. Hereby it is possible to use intermediate bearing walls of a single piece and rolling bearings. Moreover, means for driving auxiliary apparatus may also be provided at the free ends of the crankshafts as well as the ends of the collecting or intermediate shafts.

If the motors are coupled with adjustable propellers, the setting members may, in spite of the fact that the propeller and the crankshafts are coaxially arranged, easily be inserted at the rear end of the shaft of the propeller. The coaxial arrangement of the propeller in most cases is suitable. The collecting shaft or one of the intermediate shafts also may be used as carrier for the propeller.

What I claim is:

1. A power transmitting unit for aircraft comprising in combination, coaxially disposed crankshafts, a plurality of star-connected cylinder units including pistons and piston rods cooperating with said crankshafts, said star-connected cylinder units being arranged coaxially in staggered relation, two collecting shafts disposed substantially parallel with said crankshafts for accumulation of the individual outputs of said cylinder units, a large gear wheel on each of said crankshafts meshing with a small gear wheel on one of said collecting shafts, two driven shafts coaxially disposed with regard to said crankshaft, and a speed reducing gear mechanism for transmitting the rotary motion from each of said collecting shafts to one of said driven shafts whereby said collecting shafts are driven at a substantially higher speed than said crankshafts and said driven shafts.

2. A power transmitting unit for aircraft comprising in combination, coaxially disposed crankshafts, a plurality of star-connected cylinder units including pistons and piston rods cooperating with said crankshafts, said star-connected cylinder units being arranged coaxially in staggered relation, two collecting shafts disposed substantially parallel with said crankshafts for accumulation of the individual outputs of said cylinder units, a large gear wheel on each of said crankshafts, said large gear wheels being arranged adjacent to each other and meshing each with a small gear wheel on one of said collecting shafts, two driven shafts coaxially disposed with regard to said crankshafts, and a speed reducing gear mechanism for transmitting the rotary motion from each of said collecting shafts to one of said driven shafts whereby said collecting shafts are driven at a substantially higher speed than said crankshafts and said driven shafts.

FRITZ GOSSLAU.